C. J. DAVIS.
DUST PAN.
APPLICATION FILED NOV. 14, 1910.
984,356.
Patented Feb. 14, 1911.
2 SHEETS—SHEET 1.
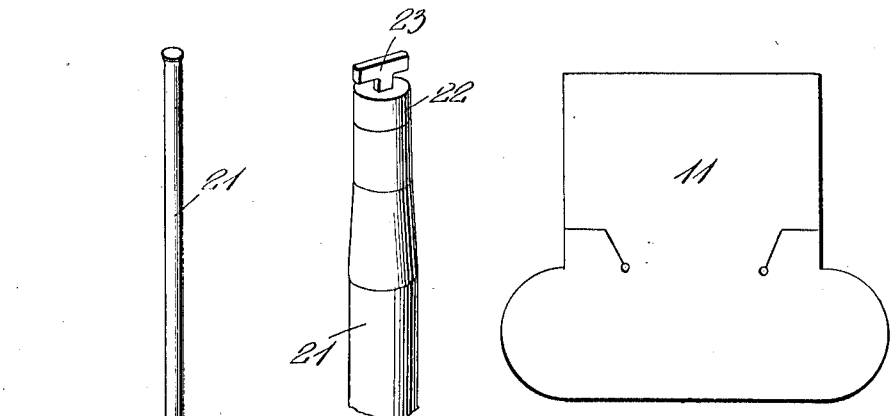
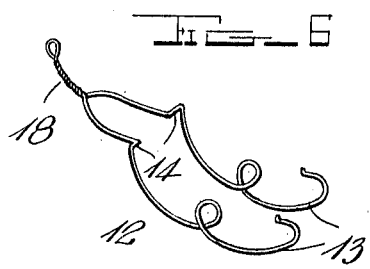
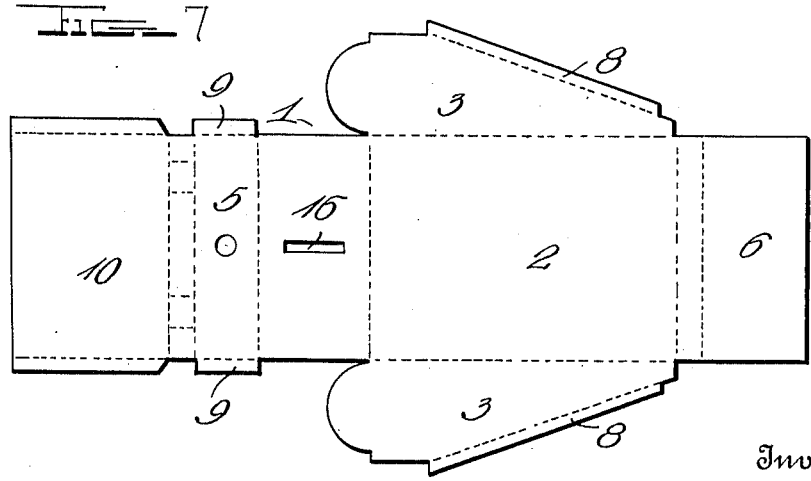
Witnesses
O. B. Hopkins
Inventor
Charles J. Davis
by H. B. Willson &co
Attorneys

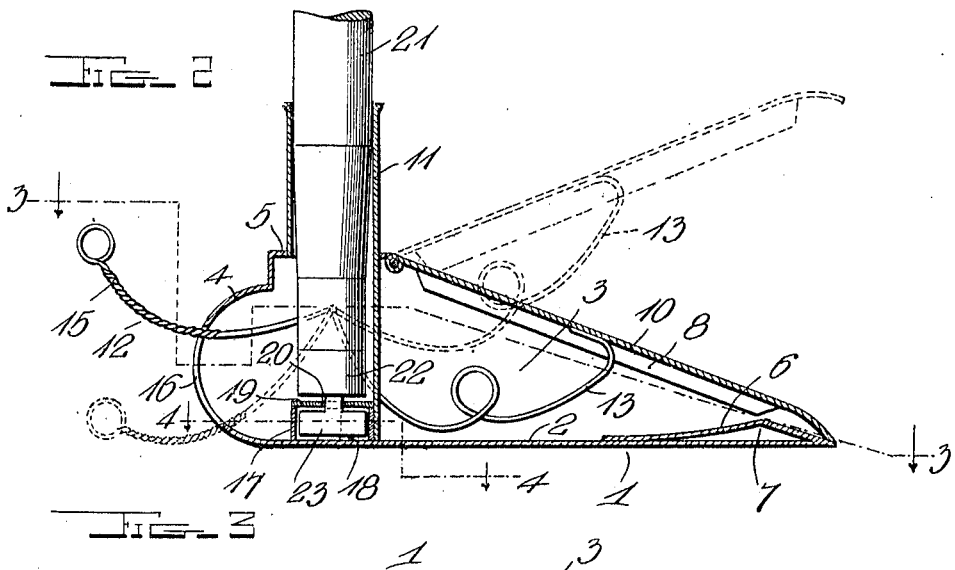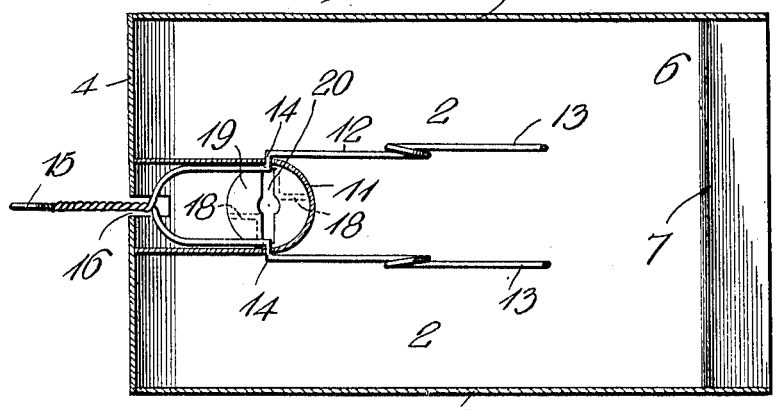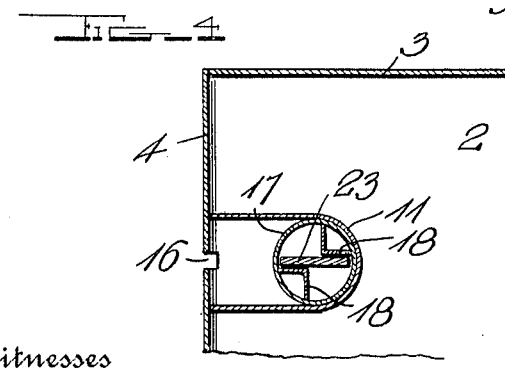

UNITED STATES PATENT OFFICE.

CHARLES J. DAVIS, OF CHICAGO, ILLINOIS, ASSIGNOR OF ONE-HALF TO JOHN STAMP, OF LIBERAL, KANSAS.

DUST-PAN.

984,356. Specification of Letters Patent. Patented Feb. 14, 1911.

Application filed November 14, 1910. Serial No. 592,271.

*To all whom it may concern:*

Be it known that I, CHARLES J. DAVIS, a citizen of the United States, residing at Chicago, in the county of Cook and State of Illinois, have invented certain new and useful Improvements in Dust-Pans; and I do declare the following to be a full, clear, and exact description of the invention, such as will enable others skilled in the art to which it appertains to make and use the same.

This invention relates to improvements in dust pans.

One object of the invention is to provide an improved construction of dust pan having means whereby the dust when swept up into the pan will be prevented from falling or being blown out of the same.

Another object is to provide a dust pan having a detachably connected handle of such length as to permit the pan to be firmly held without stooping while dust is being swept into the same.

With the foregoing and other objects in view, the invention consists of certain novel features of construction, combination and arrangement of parts as will be more fully described and particularly pointed out in the appended claims.

In the accompanying drawings: Figure 1 is a perspective view of a dust pan constructed in accordance with my invention; Fig. 2 is a central vertical longitudinal sectional view of the same showing the cover of the pan in closed position in full lines and in open position in dotted lines; Fig. 3 is a horizontal sectional view of the pan on the line 3—3 of Fig. 2 with the handle removed; Fig. 4 is a detail horizontal sectional view through the rear end of the pan and the handle socket on the line 4—4 of Fig. 2 showing the arrangement of the stops in said socket for limiting the turning movement of the handle; Fig. 5 is a detail perspective view of the lower end of the handle; Fig. 6 is a similar view of the cover operating lever; Fig. 7 is a plan view of the metal blank from which the pan and cover are formed; Fig. 8 is a similar view of the metal blank from which the handle socket is formed.

Referring more particularly to the drawing, 1 denotes the body portion of my improved pan which is preferably formed from a metal blank cut in the shape shown in Fig. 7 of the drawing, said blank being bent to form the bottom 2, sides 3, rear ends 4, stationary top section 5, and a stop portion or guard 6 arranged in the front edge or mouth of the pan to prevent the dust or dirt from falling back from the mouth of the pan after being swept into the same. It will be noted that the stop or guard 6 is formed by bending back the metal projecting beyond the forward edge of the bottom of the pan and securing the metal thus folded back to the upper side of the bottom of the pan, leaving an upwardly projecting ridge or bend 7 in the metal adjacent to the front edge of the bottom as shown. It will also be noted that the upper edges of the metal forming the sides and top of the pan are extended and the extended edges of the sides bent or folded down thus forming reinforcing strips 8, while the extended portions at the ends of the stationary top section are bent down to form attaching flanges 9 which engage the upper edges of the rear portion of the sides to which said flanged ends of the top are rigidly secured in any suitable manner. The hinged cover portion 10 of the pan is also formed on and cut from the end of a blank opposite to the end forming the mouth of the pan and on the opposite side edges of the hinged cover 10 are formed downwardly projecting flanges which engage and fit over the upper edges of the side pieces of the pan. The cover section is hingedly connected at its upper edge to the forward edge of the stationary portion of the cover and the forward edge of the hinged cover is bent or curved down to fit into close engagement with the forward edge or mouth of the pan so that the cover when down will form a tight closure for the forward portion of the pan.

The rear end of the pan is extended beyond the rear edge of the stationary portion of the top and said extended end is curved or rounded as shown. In the rear end and extended portion of the pan is arranged a handle socket 11 which is preferably formed from a metal blank cut in the manner shown in Fig. 8 of the drawing. The socket 11 is provided with a tubular upper portion which projects through an aperture in the stationary portion of the top and extends above the latter a sufficient distance to provide a firm seat for the handle hereinafter described.

Pivotally mounted in the lower portion of the socket 11 is a forked foot-operated cover-opening lever 12 which is preferably constructed of heavy wire in the form shown in Fig. 6, the foot end being preferably formed of two wires twisted on each other, as shown at 18 and provided with a terminal loop 15. The diverging tines of this lever are centrally offset to provide axles 14 which are journaled in bearing apertures in the sides of the lower portion of the handle socket, as shown. After forming the axle 14, the tines are curved and the terminals thereof bent inward to form cover engaging members 13.

In the lower end of the socket 11 is arranged a handle locking mechanism comprising a short tube 17 in which is arranged at diametrically opposite points substantially V-shaped stop members 18. On the upper end of the tube 17 is secured a locking plate 19 in which is formed a double key hole slot 20 which is disposed at right angles to one of the sides of the stops 18.

Adapted to be engaged with the socket 11 is a handle 21, said handle being of such length as to permit the pan to be firmly held by the operator without stooping while the dust or dirt is being swept into the same. The handle 21 is detachably secured in the socket 11 by providing said handle on its lower end with a ferrule 22 having formed thereon an inverted T-shaped head 23 which, when the handle is inserted in the socket in its proper position, is adapted to enter the double key-hole slot 20 between the stops 18, after which the handle is given a half turn in either direction which will bring the T-shaped head across the slot and into engagement with the stops in the tube 17.

In using the pan, the latter is brought into position to receive the dust or dirt swept up and the foot is engaged with the treadle end of the cover operating lever whereupon when said end is depressed, the hinged portion of the cover will be swung open. When the cover has thus been swung the pan is firmly held by gripping the handle with the left hand, while the dust and dirt is swept into the pan with the right hand. After the dust has thus been swept into the pan, the pressure on the treadle end of the lever is released and the cover permitted to close, whereupon the dust and dirt will be entirely inclosed in the pan and may be readily carried from one place to another without danger of the dust or dirt falling or being blown out of the pan.

From the foregoing description taken in connection with the accompanying drawings, the construction and operation of the invention will be readily understood without requiring a more extended explanation.

Having thus described my invention, what I claim is:

1. A dust pan comprising a body member, a handle socket therein, a hinged cover, and a forked foot-operated cover-opening lever having offsets in the tines thereof forming axles, said axles being mounted in the walls of the handle socket.

2. A dust pan comprising a body member, a handle socket therein, a hinged cover, and a forked foot-operated cover-opening lever bent intermediately of its ends and twisted together adjacent the bend therein with the side members thereof diverging from said bent portion and provided with intermediate offsets forming axles, said axles being mounted in the walls of said handle socket and the terminals of said side members being bent to form cover engaging members.

3. A dust pan comprising a body portion, a hinged cover, a cover operating lever adapted to be engaged by the foot to open said hinged cover, a handle socket arranged in the rear portion of the pan, a handle locking mechanism arranged in said socket, said mechanism comprising a tube having formed therein, oppositely disposed stop plates, a locking plate arranged on said tube, said plate having formed therein a double key-hole slot, a handle adapted to be engaged with said socket, said handle having on its lower end a T-shaped head adapted to be inserted through said slot.

In testimony whereof I have hereunto set my hand in presence of two subscribing witnesses.

CHARLES J. DAVIS.

Witnesses:
M. SIMON,
JOHN R. LEFEVRE.